United States Patent [19]

Matouka et al.

[11] Patent Number: 4,723,105
[45] Date of Patent: Feb. 2, 1988

[54] DUAL VOLTAGE MOTOR VEHICLE ELECTRICAL SYSTEM

[75] Inventors: Michael F. Matouka; Thomas A. Radomski, both of Utica, Mich.; Larry J. Leaf, Anderson, Ind.

[73] Assignee: General Motors Corporation, Detroit, Mich.

[21] Appl. No.: 924,780

[22] Filed: Oct. 30, 1986

[51] Int. Cl.[4] .............................. H02J 7/00; H02J 7/14
[52] U.S. Cl. ........................................ 320/17; 322/90; 307/16
[58] Field of Search ................. 320/15, 17, 6; 322/90, 322/94; 307/16

[56] References Cited

U.S. PATENT DOCUMENTS

| | | | |
|---|---|---|---|
| 3,667,025 | 5/1972 | Campbell et al. | 320/15 |
| 3,671,843 | 6/1972 | Huntzinger et al. | 320/15 |
| 4,236,107 | 11/1980 | Templin | 320/21 |
| 4,479,083 | 10/1984 | Sullivan | 320/6 |
| 4,491,779 | 1/1985 | Campbell et al. | 320/6 |
| 4,492,912 | 1/1985 | Nowakowski | 320/6 |

Primary Examiner—R. J. Hickey
Attorney, Agent, or Firm—C. R. Meland

[57] ABSTRACT

A dual voltage motor vehicle electrical system wherein batteries are series connected across the direct voltage output terminals of a generator. The system has a DC to DC converter that operates in a first mode as an equalizer to maintain the batteries in a substantially equal state of charge. When an electric starting motor is energized to crank the engine of the vehicle the converter is switched to a second mode of operation wherein it provides a substantially constant output voltage that is applied to certain electrical loads on the vehicle that require a stable voltage. The converter responds to a first reference voltage that is provided by a voltage divider connected across the batteries when operating in the first mode and responds to a second reference voltage provided by a constant voltage device when operating in the second mode. The system switches between the reference voltages, depending upon the mode of operation that is being used.

7 Claims, 5 Drawing Figures

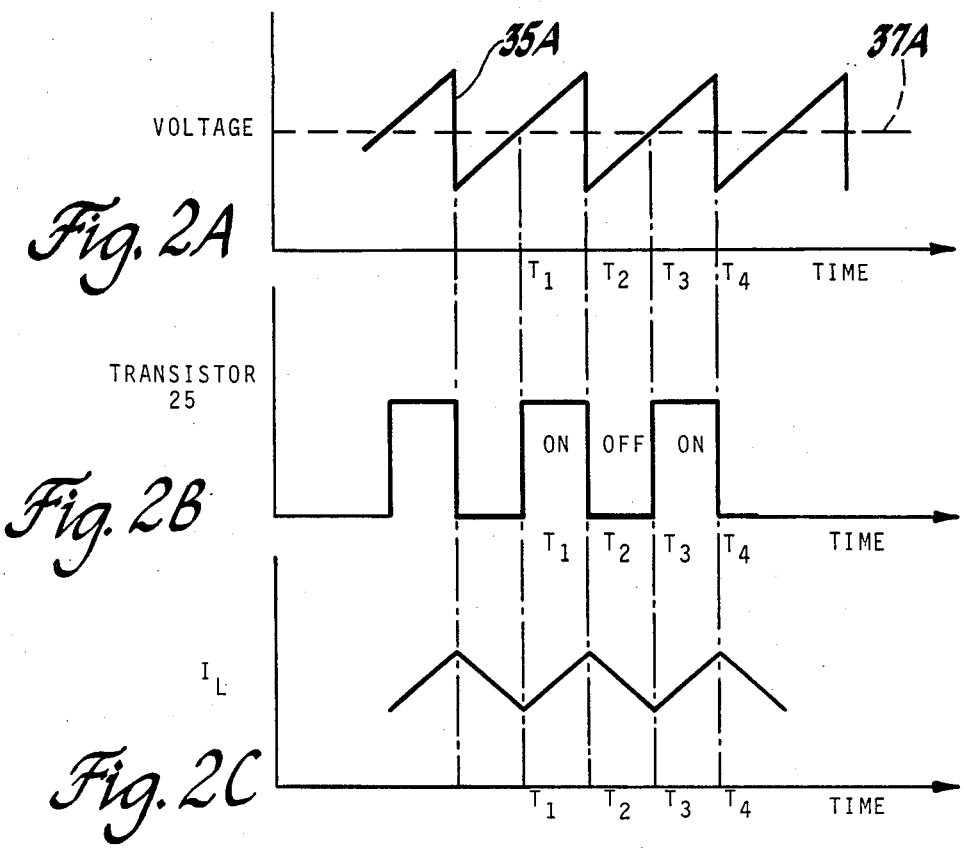
*Fig. 2A*
*Fig. 2B*
*Fig. 2C*
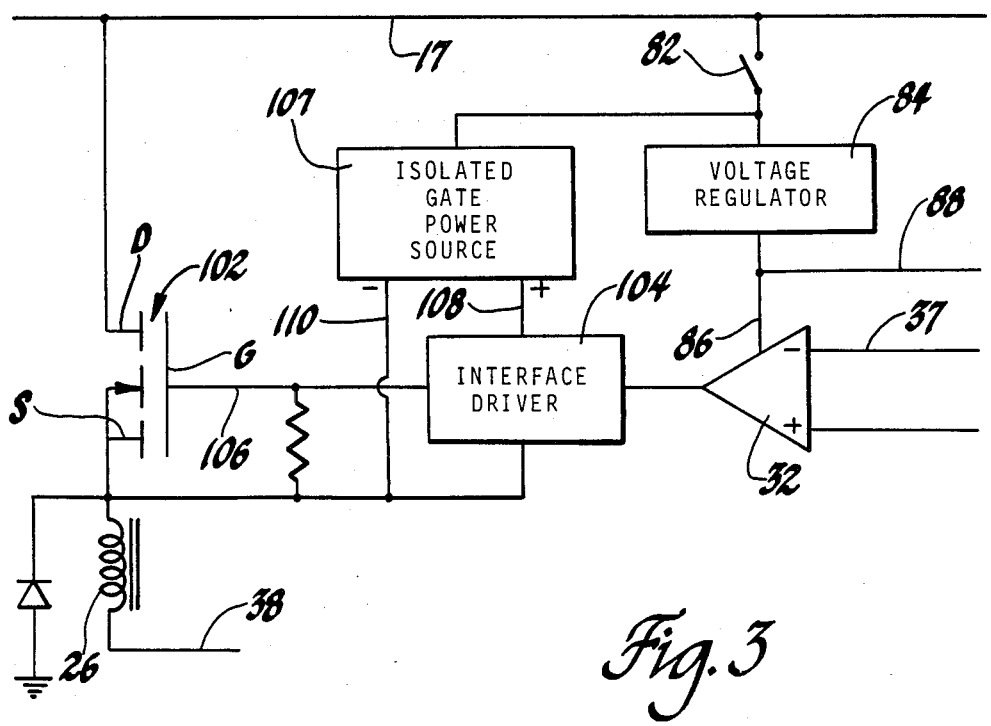
*Fig. 3*

DUAL VOLTAGE MOTOR VEHICLE ELECTRICAL SYSTEM

This invention relates to a dual voltage motor vehicle electrical system and more particularly to a dual voltage electrical system that is capable of developing a stable supply voltage for certain electrical loads on the motor vehicle when the engine is being cranked by an electric cranking motor that is energized by the batteries of the system.

Dual voltage motor vehicle electrical systems are well known to those skilled in the art, one example being the system disclosed in the U.S. Pat. to Campbell et al., No. 3,667,025 issued May 30, 1972. In that patent a pair of series connected 12 volt batteries are charged by a 24 volt charging system. The system has a DC to DC converter which is capable of supply charging current to one of the batteries. The DC to DC converter responds to the difference in the voltage at a junction of the batteries and a voltage that is one-half of the total voltage across the series connected batteries.

When an electric cranking motor on a motor vehicle is energized to crank the engine there is a substantial drop in terminal voltage of the battery or batteries that supply current to the cranking motor due to the large current that is supplied to the cranking motor. By way of example, if a 24 volt cranking motor were to be connected across two series connected 12 volt batteries it is possible that the total voltage across the two 12 volt batteries may drop as low as 14 volts and the voltage at the junction of the two batteries may drop as low as 7 volts. This lowering of the terminal voltage of the batteries, during engine cranking, creates a voltage level problem in that certain electrical loads have trouble functioning properly at this low voltage. In addition there are certain electrical loads on motor vehicles, such as electronic controls, that require a minimum stable input voltage for proper operation and during cranking the available voltage may drop below this minimum value.

It accordingly is one of the objects of this invention to provide a dual voltage motor vehicle electrical system wherein means are provided for developing a stable voltage having at least a predetermined magnitude for energizing certain loads on the motor vehicle when the electric starting motor is energized to crank the engine. By way of example, a stable voltage of 12 volts may be provided for energizing the engine circuits when the electric starter or cranking motor is energized. The engine circuits are comprised of such loads as the electric motor driven fuel pump, spark ignition, ECM (engine control module) and fuel injectors, all of which function better with a stable voltage during the critical cranking period.

Another object of this invention is to provide a dual voltage motor vehicle electrical system wherein a pair of series connected batteries are connected across the direct voltage output terminals of a battery charging generator and wherein a voltage equalizer that takes the form of a DC to DC converter is operative to maintain the voltage across the batteries substantially equal during a run mode of operation and further wherein the equalizer is so controlled when the electric cranking motor is energized as to provide a stable voltage having at least a predetermined magnitude for supplying electrical loads on the vehicle that require a stable regulated voltage.

IN THE DRAWINGS

FIGS. 2A, 2B and 2C illustrate waveforms that exist in the system illustrated in FIG. 1; and FIG. 3 illustrates a modification of a portion of the circuit illustrated in FIG. 1.

Figure 1:
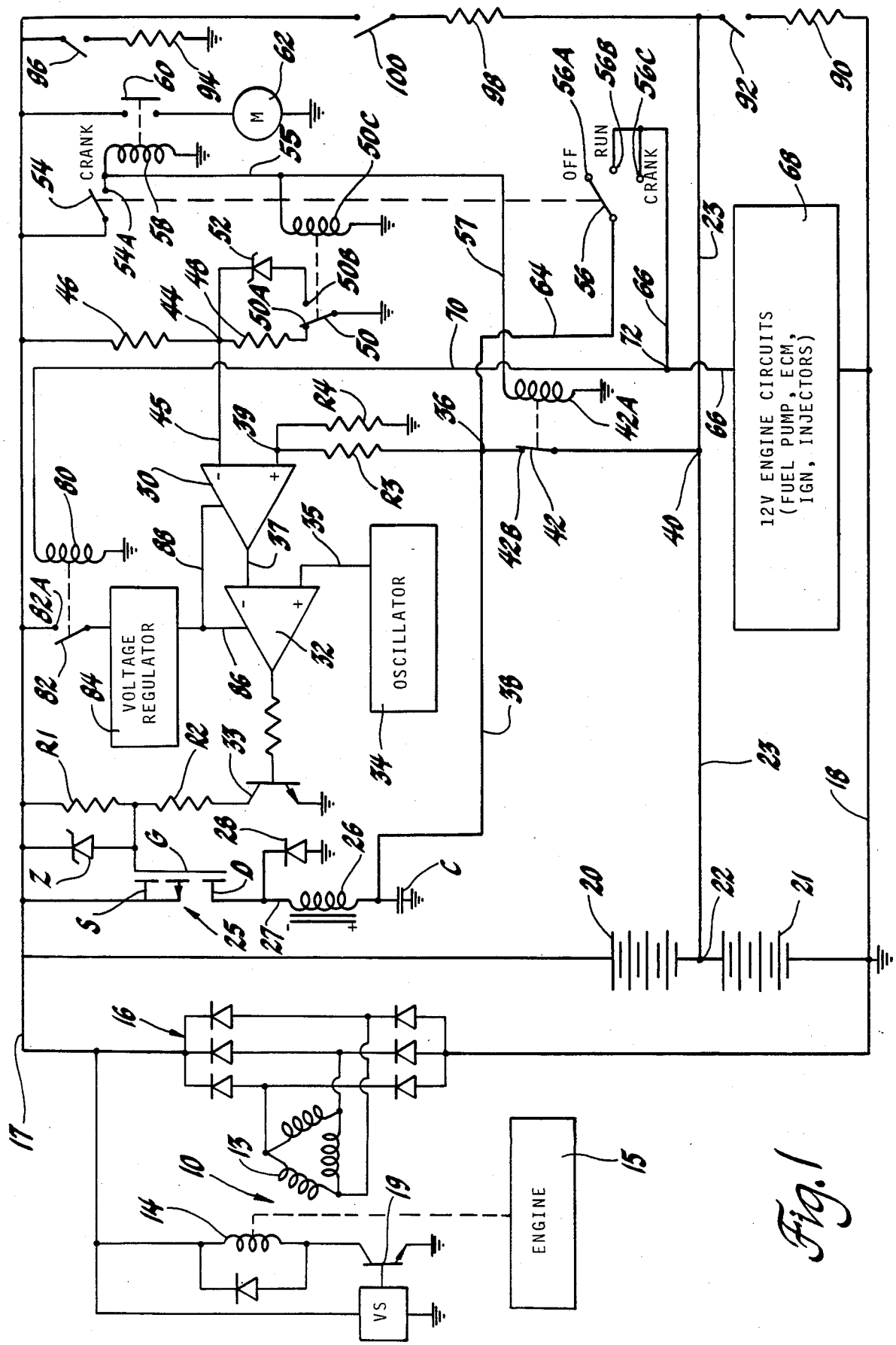
FIG. 1 is a schematic circuit diagram of a dual voltage motor vehicle electrical system made in accordance with this invention.

It will be assumed, in the further description of this invention, that the dual voltage motor vehicle electrical system is a so-called 12–24 volt system wherein a pair of 12 volt batteries are charged from a 24 volt generator.

Referring now to the drawings and more particularly to FIG. 1, the reference numeral 10 generally designates an alternating current generator that has a three-phase delta connected stator or output winding 13 and a field winding 14. The field winding 14 is carried by the rotor of the generator in a well known manner and the rotor is driven by an engine 15 of a motor vehicle. The three-phase output winding 13 is connected to a three-phase full wave bridge rectifier 16. The direct voltage output terminals of the bridge rectifier 16 are respectively connected to positive and negative power supply conductors designated respectively by reference numerals 17 and 18 and the conductor 18 is grounded, as shown. The field current of field winding 14 is controlled by a conventional voltage regulator that includes a voltage sensing circuit VS and an NPN transistor 19. A field discharge diode is connected across field winding 14. The voltage sensing circuit VS senses the magnitude of the voltage between conductors 17 and 18 and varies the conduction of transistor 19 to control field conductor to thereby maintain the voltage across conductors 17 and 18 at a desired regulated value. The output voltage of the generator or alternator 10 may be regulated such that it tends to maintain a constant voltage between conductors 17 and 18 of approximately 28 volts.

The diode-rectified alternator 10 supplies charging current to a pair of series connected 12 volt storage batteries designated as 20 and 21 and supplies current to other electrical loads on the motor vehicle. The storage batteries 20 and 21 are each comprised of six cells that may be contained within a common battery case. The positive terminal of battery 20 is connected to power supply conductor 17. The negative terminal of the battery 20 and the positive terminal of the battery 21 are connected together and to a common junction 22. The negative side of the battery 21 is connected to the grounded power supply conductor 18. The junction 22 is connected to a 12 volt power supply conductor 23. The batteries 20 and 21 could be formed as separate batteries having separate battery casings and with such an arrangement they would be electrically connected in the same manner as illustrated in FIG. 1.

The electrical system of FIG. 1 has a DC to DC converter that provides the function of an equalizer. The DC to DC converter is comprised of a semiconductor switch that takes the form of a P channel field effect transistor 25 (FET), an inductor 26, a diode 28, an error amplifier 30, a voltage comparator 32, driver NPN transistor 33 and a saw-tooth waveform oscillator 34. The source S of FET 25 is connected to power supply conductor 17 and its drain D is connected to one side of the inductor 26 by conductor 27. The gate G of transistor 25 is connected to a junction located between resistors R1 and R2. The resistor R2 connects this junction to the collector of transistor 33. A Zener diode Z is connected between the conductor 17 and the gate G of transistor 25. The Zener diode Z limits the voltage applied to the gate of transistor 25 and may have a breakdown voltage of about 15 volts. The diode 28 is connected between conductor 27 and ground. The output of voltage comparator 32 is connected to the base of driver transistor 33. The output of oscillator 34 is connected to the positive input terminal of comparator 32 by conductor 35. A conductor 37 connects the output of error amplifier 30 to the negative input terminal of comparator 32. One side of the inductor 26 is connected to a junction 36 by a conductor 38. A filter capacitor C is connected between conductor 38 and ground. The junction 36 is connected to junction 40 whenever the movable relay contact 42 of a relay is in a closed position engaging fixed contact 42B, as illustrated in FIG. 1. The relay contact 42 is normally closed and is opened whenever relay coil 42A is energized. The junction 40 is connected to the 12 volt battery 21 by power supply conductor 23.

The negative terminal of the error amplifier 30 is connected by a conductor 45 to a junction 44 of a voltage divider that is comprised of resistors 46 and 48. The resistors 46 and 48 provide a scaled voltage sample of the voltage on conductor 17. The voltage divider ratio of resistors 46 and 48 can be such that the voltage at junction 44 is one-quarter of the voltage across conductors 17 and 18. The positive terminal of error amplifier 30 is connected to junction 39 of a voltage divider that is comprised of resistors R3 and R4 which provide a scaled voltage sample of the voltage at junction 36.

The system has a relay that includes a grounded movable contactor 50. Relay contactor 50 normally engages fixed contact 50A and when relay contactor 50 is engaging fixed contact 50A the voltage divider comprised of resistors 46 and 48 is connected across conductors 17 and 18 so that it responds to the voltage across conductors 17 and 18. Under this condition of operation the voltage at junction 44 will be substantially one-quarter of the voltage appearing between conductors 17 and 18.

The relay contactor 50 is shifted into engagement with fixed contact 50B whenever relay coil 50C is energized. This will occur, as will be more fully explained hereinafter, whenever the electric cranking motor for cranking the engine of the motor vehicle is energized. When the relay contact 50 engages fixed contact 50B a Zener diode 52 becomes connected between junction 44 and ground. The Zener diode 52 may have, for example, a breakdown voltage of 6 volts so that when it is in the circuit a constant voltage of approximately 6 volts is present at junction 44.

The electrical system of FIG. 1 includes a manually operable ignition switch having ganged movable contactors 54 and 56. The movable contactor 54 can engage a fixed contact 54A which has also been identified as a crank contact. The movable contact 56 can engage fixed contacts 56A, 56B and 56C which are also respectively identified as off, run and crank contacts. The switch is arranged such that contact 54 engages contact 54A only when the ignition switch is in the crank position. When contact 54 engages contact 54A relay coil 50C is energized via line 55 and relay coil 42A is energized via lines 55 and 57. When the movable contact 54 engages the fixed crank contact 54A the solenoid 58 of a 24 volt electric starter or cranking motor is also energized. This causes the contactor 60 of the starter solenoid to engage fixed contacts to thereby cause the cranking motor 62 to be energized. The cranking motor 62, as is well known to those skilled in the art, drives a pinion which meshes with the ring gear of the engine 15 when the solenoid 58 is energized to thereby crank the engine.

The movable contactor 56 is connected with a conductor 64 which in turn is connected to junction 36. The run contact 56B is connected to a conductor 66 which in turn is connected to one side of a plurality of parallel connected electrical loads designated by reference numeral 68. The opposite side of the electrical loads 68 are connected to grounded conductor 18. The electrical loads 68 are of a type that will benefit from a stable voltage for proper operation. By way of example, these electrical loads may include an electric motor for driving a fuel pump, the electronic control module or microprocessor for engine control, solenoid operated fuel injectors and electrical ignition equipment. These electrical loads may be termed engine related circuits.

The crank terminal 56C is connected to conductor 66. The conductor 66 is connected to conductor 70 at junction 72. The voltage on conductor 70 is applied to a relay coil 80 of a relay which controls relay contact 82. The relay contact 82 is a normally open contact but is closed and engages fixed contact 82A whenever relay coil 80 is energized. When relay contact 82 engages fixed contact 82A one side of a voltage regulator circuit 84 is connected to power supply conductor 17. The voltage regulator 84 feeds a constant voltage to the equalizer control circuits which include the error amplifier 30 and the voltage comparator 32 via conductors 86 and 88.

The reference numeral 90 designates a 12 volt load which is in addition to the 12 volt loads 68. The load 90 is controlled by a switch 92. The load 90 may be, for example, the parking lights on a motor vehicle. The reference numeral 94 designates 24 volt loads which are in addition to the 24 volt starting motor 62. The loads 94 are controlled by switch 96. The 24 volt loads 94 may be, for example, the rear window defogger, horns, or an electric motor driven radiator cooling fan. The reference numeral 98 designates an ungrounded 12 volt load that is energized by the voltage between conductors 17 and 23. Load 98 is controlled by switch 100 and may be the headlamps of a motor vehicle. Although only one switch has been shown for controlling a given load a switch will be provided for each individual electrical load to be controlled.

The operation of the electrical system shown in FIG. 1 will now be described. The system of FIG. 1 can operate in one of three modes, namely an off mode, a run mode and a crank mode. In the off mode, the engine is not running and the equalizer is not operating. In the crank mode the starting motor 62 is energized.

It will be assumed first of all that the system is set to operate in the run mode. In the run mode contactor 54 does not engage fixed contact 54A, and the contactor 56 engages the fixed contact 56B. The relay coils 42A and 50C are not energized and accordingly contactor 42 remains engaged with fixed contact 42B and contactor 50 remains engaged with contact 50A. The relay coil 80 is energized.

Assuming now that the engine is running and driving the generator 10, a regulated voltage is developed between conductors 17 and 18. The junction 44 will have a voltage magnitude that is approximately one-quarter of the voltage appearing between conductors 17 and 18. The voltage on junction or node 44 is applied to the error amplifier 30 via line 45. The error amplifier 30 responds to the difference in voltages at junctions 44 and 39. The voltage at junctions 40 and 39 vary in accordance with the voltage across battery 21 or in other words vary as a function of the voltage appearing between conductor 23 and ground.

The output of the error amplifier 30 is applied to the negative terminal of the voltage comparator 32 via line 37. This voltage is shown as a direct voltage level identified as 37A in FIG. 2A. The output of the saw-tooth waveform generator or oscillator 34 is applied to conductor 35 and hence to the positive terminal of voltage comparator 32. This saw-tooth waveform is illustrated in FIG. 2A and designated as 35A. The output frequency of the saw-tooth waveform generator 34 is greater than 5 khz.

With reference to FIG. 2A, it can be seen that as the direct voltage level 37A shifts upwardly or downwardly it intersects the saw-tooth waveform at various points. In FIG. 2A these intersection points are designated as $T_1$, $T_2$, $T_3$ and $T_4$. The system is arranged such that during the time period $T_1$ to $T_2$ an output voltage is developed by comparator 32 that is applied to the base of transistor 33 to bias it conductive. When transistor 33 is biased conductive, it causes transistor 25 to be biased conductive. During the time period $T_2$ to $T_3$ no drive is applied to the gate of transistor 25 and consequently it is biased nonconductive. The transistor 25 will again be biased conductive during the time period $T_3$ to $T_4$ and so on. The on and off states of transistor 25 are illustrated in FIG. 2B which also illustrates the voltage on conductor 27.

When transistor 25 is biased conductive the inductor 26 is energized from conductor 17 via a current path that includes conducting transistor 25, inductor 26, conductor 38 and then through closed contactor 42 to junction 40. The current path for inductor 26 will include loads 68, battery 21 and loads 90 if switch 92 is closed. Current is supplied to the inductor 26 and to the loads that are connected between conductor 38 and ground for a time period corresponding, for example, to the time period $T_1$ to $T_2$ shown in FIG. 2A. This current will increase along a ramp function, as illustrated in FIG. 2C, due to the inductance of inductor 26. In this regard, FIG. 2C illustrates the current $I_L$ of inductor 26 as a function of time. When transistor 25 is biased nonconductive the polarity of the voltage across inductor 26 reverses and has the polarity indicated in FIG. 1. The inductor 26 will now supply current (decreasing ramp function), as shown in FIG. 2C, to the loads (including battery 21) that are connected between conductor 38 and ground via a circuit that includes conductor 38, the loads connected between conductor 38 and ground and a return path through the diode 28. In this run condition current is supplied to the electrical loads 68 via junction 36, conductor 64, contactor 56 and conductor 66. Current is supplied to battery 21 and load 90 via closed contactor 42 and conductor 23.

The amount of current that is supplied to the loads connected between conductor 38 and ground, including the battery 21, is a function of the difference in voltage of junctions 44 and 39 or in other words the difference between one-quarter of the voltage across conductors 17 and 18, and one-half the voltage of junction 22. In this regard the resistors R3 and R4 may have equal values so that the voltage at junction 39 is one-half the voltage of junctions 22 and 36. If the voltages across batteries 20 and 21 are not equal, indicative of an unbalanced load condition, that is, where the voltage across battery 21 is lower than the voltage across battery 20, the DC to DC converter supplies current to conductor 38 in order to balance the voltages across the batteries. The amount of current that the DC to DC converter supplies to conductor 38, as mentioned above, is a function of potential difference of junctions 39 and 44. As the voltage difference between these junctions increases the direct voltage level 37A, shown FIG. 2A, moves downwardly to increase the consecutively occurring time periods that transistor 25 is conductive. This has the effect of increasing the output current of the DC to DC converter. When the voltages of junctions 39 and 44 become substantially equal the voltage level 37A moves above the peaks of the saw-tooth waveform 35A so that transistor 25 remains nonconductive. In summary, the amount of current supplied by the DC to DC converter to the loads that are connected between conductor 38 and ground is varied to correct for any substantial difference in voltage across batterys 20 and 21. The DC to DC converter therefore tends to maintain the voltages across batteries 20 and 21 substantially equal and hence may be termed an equalizer.

As previously mentioned, the system of FIG. 1 can operate in either a run mode or in a crank mode and the run mode has been described. In the crank mode contactor 54 engages contact 54A and contactor 56 engages fixed contacts 56B and 56C. The cranking motor 62 will now be energized due to the closure of contactor 54. The closure of contactor 54 energizes relay coils 42A and 50C with the result that contactor 42 is shifted out of engagement with fixed contact 42B and movable contactor 50 is shifted into engagement with contact 50B. The opening of the movable contactor 42 disconnects the line 38 from conductor 23 and accordingly disconnects the output of the DC to DC converter from battery 21. The electrical load 68 can now be energized from conductors 38 and 64 via contactor 56 and conductor 66. It should be observed that the loads 68 are now completely disconnected from battery 21 and the sole supply of current for these loads is now from the output of the DC to DC converter via line 38. When contactor 50 engages fixed contact 50B the Zener diode 52 is connected into the circuit and accordingly the voltage at junction 44 will be a substantially constant voltage of 6 volts. The voltage at junction 44 is a constant 6 volts and the voltage at junction 39 follows one-half the voltage between junction 36 and ground. The system now varies the conduction time of transistor 25 so as to maintain a substantially constant voltage of approximately 12 volts at junction 36. In this crank mode the current path for energizing inductor 26, when transistor 25 is conductive, is through the loads 68. When transistor 25 is biased nonconductive inductor 26 supplies current to the loads 68 via conductor 38, line 64, contactor 56, line 66 and diode 28. Thus, the system operates to maintain a constant voltage at junction 36 that is substantially twice the voltage at junction 44. With a 6 volt Zener diode 52 a substantially constant voltage of 12 volts is now applied to the load circuit 68.

In regard to the crank mode of operation it will be appreciated that when the cranking motor 62 is energized the voltage between conductors 17 and 18 and between junction 22 and conductor 18 will all drop. However, even though these voltages drop, a constant voltage of approximately 12 volts will nevertheless be supplied to the electrical loads 68 by the DC to DC converter. Therefore, these loads will be energized with a stable constant voltage having a magnitude that is sufficient to properly operate these loads.

When contactor 54 is open and contactor 56 is in an off position, relay coil 80 is deenergized and contactor 82 moves to an open position to deenergize the DC to DC converter.

It will be apparent that if the equalizer or DC to DC converter did not include circuitry for developing a stable voltage for loads 68, when the electric starting motor 62 is energized, the voltage across the loads 68 could drop to an undesirable level during engine cranking. Thus, if the system did not include the circuitry of this invention resistors 46 and 48 would be permanently connected between conductor 17 and ground and the loads 68 would be energized from conductor 23. In such a supposed system the equalizer would tend to provide equal voltages across batteries 20 and 21 but the voltage across battery 21 and hence the voltage applied to loads 68 could drop as low as 7 volts when the cranking motor 62 was energized.

FIG. 3 illustrates a modification of a portion of the system shown in FIG. 1 where an N-channel enhancement mode metal oxide field effect transistor 102 has been substituted for transistor 25 of FIG. 1. The same reference numerals have been used in FIGS. 1 and 23 to identify corresponding circuit elements. The drain D of transistor 102 is connected to conductor 17 and its source S is connected to one side of inductor 26. The gate G is connected to the output of a interface driver 104 by conductor 106. The interface driver receives input power from an isolated gate power source 107 via conductors 108 and 110. The isolated gate power source 107 may be a DC to DC converter that develops a direct output voltage that is applied across conductors 108 and 110.

This electrically isolated source 107 is referenced to the source of transistor 102 and interface driver 104 by conductor 110. The interface driver 104 is controlled by the output of voltage comparator 32. The output of comparator 32 periodically applies a signal to interface driver 104 which causes the interface driver to develop output voltage on line 106 that is applied to the gate of transistor 102. This voltage is high enough to bias transistor 102 conductive between its drain and source. Electrically isolated power sources and driver circuits are well known to those skilled in the art and accordingly neither are shown in detail. When the output of comparator 32 is such that transistor 102 is to be biased nonconductive the output of interface driver 104 goes to zero potential to thereby bias transistor 102 nonconductive. FIG. 3 is included to show how the subject invention can be made to work equally well with N-channel or P-channel transistors. It can be further reasoned to use other solid state switches such as NPN or PNP bipolar transistors.

In FIG. 1 varies relays and manually operable switches are illustrated for setting the system in either the run mode or the crank mode. The relays and switches can take various forms and could be solid-state switching devices.

The desirability of applying a stable, substantially constant voltage to the load or loads 68 will now be further discussed. One example of this is the electric motor driven fuel pump. In a system that does not provide a stable voltage to the fuel pump motor, the voltage applied to the motor drops during engine cranking and the pumping pressure drops, resulting in poor fuel control. This does not occur with the system of this invention because the voltage across the loads 68 is maintained substantially constant. Moreover, with a stable voltage available the loads 68 can be designed to maximize their benefit from being energized by a stable voltage.

In regard to the operation of the equalizer, it was pointed out that load current supplied by conductor 38 ramps up when inductor 26 is energized and ramps down when inductor 26 is deenergized, as shown in FIG. 2C. This up and down ramping of the current provides an average current which is controlled in a manner that has been described.

The dual voltage electrical system has been described as a so-called 12–24 volt system where batteries 20 and 21 are 12 volt batteries. The system of this invention can be used where the batteries 20 and 21 do not have equal terminal voltages. As one example, the system is applicable to a system where the battery 20 would be a 24 volt battery and the battery 21 a 12 volt battery. In such a system the control circuitry, for example the voltage divider ratio of resistors 46 and 48 would be suitably modified to accommodate a system where the battery 20 would be a 24 volt battery and the battery 21 a 12 volt battery. In this supposed system, where battery 20 is a 24 volt battery and battery 21 a 12 volt battery the system would be arranged to maintain the voltage at junction 22 at one-third of the voltage on conductor 17. During cranking the supposed system would operate in the same manner as has been described, that is, a stable voltage would be applied to load 68.

The embodiments of the invention in which an exclusive property or privilege is claimed are defined as follows:

1. A dual voltage electrical system for a motor vehicle comprising, a direct voltage generator, positive and negative power supply conductors connected to said generator, a pair of batteries connected in series across said power supply conductors, said batteries having a common junction with the positive terminal of one of said batteries and the negative terminal of the other battery connected to said common junction, control means coupled to said batteries operative in a first mode of operation to maintain the voltages across the batteries in a predetermined relationship, an electric starter motor for cranking the engine of the vehicle, means responsive to the energization of said starter motor for causing said control means to operate in a second mode of operation such that it develops a substantially constant output voltage of a predetermined magnitude, and means for applying said constant output voltage to an electrical load on the vehicle.

2. A dual voltage electrical system for a motor vehicle comprising, a direct voltage generator, positive and negative power supply conductors connected to said generator, a pair of batteries having substantially equal open circuit terminal voltages connected in series across said power supply conductors, said batteries having a common junction with the positive terminal of one of said batteries and the negative terminal of the other battery connected to said common junction, control means coupled to said batteries operative in a first mode of operation to maintain the voltages across the batteries substantially equal, an electric starter motor for cranking the engine of the vehicle, means responsive to the energization of said starter motor for causing said control means to operate in a second mode of operation such that it develops a substantially constant output voltage of a predetermined magnitude, and means for applying said constant output voltage to an electrical load on the vehicle.

3. A dual voltage electrical system for a motor vehicle comprising, a direct voltage generator, positive and negative power supply conductors connected to said generator, a pair of batteries having substantially equal open circuit terminal voltages connected in series across said power supply conductors, said batteries having a common junction with the positive terminal of one of said batteries and the negative terminal of the other battery connected to said common junction, control means coupled to said batteries operative in a first mode of operation to maintain the voltages across the batteries substantially equal, said control means being switchable to a second mode of operatin in which it develops a substantially constant output voltage, switching means operative when closed for applying said substantially constant output voltage to an electrical load on said vehicle, an electric starter motor for cranking the engine of said vehicle, and means operative when said starter motor is energized for causing said control means to operate in said second mode whereby said electrical load is energized with a substantially constant voltage when said starter motor is energized and said switching means is closed.

4. A dual voltage electrical system for a motor vehicle comprising, a direct voltage generator, positive and negative power supply conductors connected to said generator, a pair of batteries having substantially equal open circuit terminal voltages connected in series across said power supply conductors, said batteries having a common junction with the positive terminal of one of said batteries and the negative terminal of the other battery connected to said common junction, control means coupled to said batteries operative in a first mode of operation to maintain the voltages across the batteries substantially equal, said control means being switchable to a second mode of operation in which it develops a substantially constant output voltage, an electric starter motor for cranking the engine, an electrical load on said vehicle, circuit means including switching means operative in a first switching state of said switching means to connect the output of said control means to a first battery, said circuit means operative to disconnect the output of said control means from said first battery and connect it to said electrical load when said switching means is operating in a second switching state, and means for causing said control means to operate in said second mode and for causing said switching means to assume said second switching state when said electric starter motor is energized whereby said control means applies a substantially constant voltage to said electrical load when said electric starter motor is energized and whereby said first battery is disconnected from the output of said control means when said electric starter motor is energized.

5. A dual voltage electrical system for a motor vehicle comprising, a direct voltage generator, positive and negative power supply conductors connected to said generator, a pair of batteries having substantially equal open circuit terminal voltages connected in series across said power supply conductors, said batteries having a common junction with the positive terminal of one of said batteries and the negative terminal of the other battery connected to said common junction, control means connected to said batteries, means connected across said batteries for providing a first voltage that is a function of the voltage across the batteries, means for providing a second voltage that is a function of the voltage across one of the batteries, said control means when operating in a first mode of operation operative in response to the difference in said first and second voltages for maintaining the voltages across the batteries substantially equal, means operative when said control means is operating in a second mode of operation for causing said control means to develop a third voltage that has a substantially constant value, an electric starter motor for cranking the engine, an electrical load on said vehicle, circuit means including switching means operative in a first switching state of said switching means to connect the output of said control means to a first battery, said circuit means operative to disconnect the output of said control means for said first battery and connect it to said electrical load when said switching means is operating in a second switching state, and means for causing said control means to operate in said second mode and for causing said switching means to assume said second switching state when said electric starter motor is energized whereby said control means applies a substantially constant voltage to said electrical load when said electric starter motor is energized and whereby said first battery is disconnected from the output of said control means when said electric starter motor is energized.

6. The electrical system according to claim 2 wherein the control means is a DC to DC converter.

7. The electrical system according to claim 2 wherein the control means is a DC to DC converter that comprises an inductor, a switching means for connecting and disconnecting said inductor to and from said batteries and a diode for providing a current path to one side of said inductor when said switching means disconnects said inductor from said batteries.

* * * * *